(12) United States Patent
Manson et al.

(10) Patent No.: US 12,072,818 B2
(45) Date of Patent: Aug. 27, 2024

(54) SYSTEMS AND METHODS FOR CONCURRENT LOGGING AND EVENT CAPTURE

(71) Applicant: Infineon Technologies AG, Neubiberg (DE)

(72) Inventors: Neal Manson, Southfield, MI (US); Medu Harsha, Colorado Springs, CO (US)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/731,301

(22) Filed: Apr. 28, 2022

(65) Prior Publication Data

US 2023/0350820 A1 Nov. 2, 2023

(51) Int. Cl.
| | |
|---|---|
| G06F 13/28 | (2006.01) |
| G06F 9/46 | (2006.01) |
| G06F 11/30 | (2006.01) |
| G06F 13/16 | (2006.01) |

(52) U.S. Cl.
CPC .......... G06F 13/1673 (2013.01); G06F 9/467 (2013.01); G06F 11/3075 (2013.01); G06F 13/28 (2013.01)

(58) Field of Classification Search
CPC .................................................. G06F 13/1673
USPC ........................................................ 711/154
See application file for complete search history.

(56) References Cited

U.S. PATENT DOCUMENTS

| | | | | |
|---|---|---|---|---|
| 4,638,289 | A * | 1/1987 | Zottnik | G07C 5/0825 340/436 |
| 6,490,513 | B1 * | 12/2002 | Fish | G07C 5/008 340/439 |
| 7,359,821 | B1 * | 4/2008 | Smith | G01L 5/0052 702/113 |
| 9,959,764 | B1 * | 5/2018 | Binion | B60R 21/00 |
| 2002/0163577 | A1 * | 11/2002 | Myers | G08B 13/19695 348/E7.086 |
| 2003/0149808 | A1 * | 8/2003 | Burton | G06F 13/28 710/19 |

(Continued)

OTHER PUBLICATIONS

Cypress: SPI Guide for F-RAM. Published in 2017.
DMA Linked List Mode usage. Published in 2020.

*Primary Examiner* — Titus Wong
(74) *Attorney, Agent, or Firm* — Eschweiler & Potashnik, LLC

(57) ABSTRACT

Systems, methods, and circuitries are disclosed for generating and storing event data records. In one example, a method includes, for each of a plurality of monitored parameters, controlling a memory controller to write pre-event system data from a controller memory to a buffer in a non-volatile memory. In response to detection of an event, for each of the plurality of monitored parameters, the method includes controlling the memory controller to write post-event system data occurring during a post-event time window from the controller memory to an event data record for the event in the non-volatile memory; and controlling the memory controller to copy pre-event system data for each monitored parameter from the buffer to the event data record for the event, wherein, writing of post-event system data and copying of pre-event system data are performed concurrently.

20 Claims, 5 Drawing Sheets

(56) References Cited

U.S. PATENT DOCUMENTS

| | | | |
|---|---|---|---|
| 2005/0235113 A1* | 10/2005 | Smirnov | H04N 21/44004 |
| | | | 711/202 |
| 2006/0004946 A1* | 1/2006 | Shah | G06F 13/28 |
| | | | 711/100 |
| 2006/0092043 A1* | 5/2006 | Lagassey | G07C 5/0891 |
| | | | 340/907 |
| 2008/0005669 A1* | 1/2008 | Eilertsen | G11B 27/034 |
| | | | 715/776 |
| 2010/0023208 A1 | 1/2010 | Fukushima et al. | |
| 2010/0185362 A1* | 7/2010 | Vialatte | G06F 30/15 |
| | | | 707/825 |
| 2011/0211810 A1* | 9/2011 | Vanman | G11B 20/00471 |
| | | | 386/E9.011 |
| 2012/0014659 A1* | 1/2012 | Hugosson | G08B 13/19669 |
| | | | 386/E5.069 |
| 2012/0233360 A1* | 9/2012 | Go | G06F 13/28 |
| | | | 710/23 |
| 2013/0024716 A1* | 1/2013 | Hadley | G06F 21/79 |
| | | | 713/600 |
| 2013/0336634 A1* | 12/2013 | Vanman | H05K 999/99 |
| | | | 386/247 |
| 2020/0250901 A1* | 8/2020 | Golov | B60R 21/0134 |
| 2020/0250902 A1* | 8/2020 | Golov | B60R 21/0136 |
| 2022/0254202 A1* | 8/2022 | Golov | B60R 21/0134 |

* cited by examiner

SYSTEMS AND METHODS FOR CONCURRENT LOGGING AND EVENT CAPTURE

FIELD

The present disclosure relates to the field of microcontroller units (MCUs) that monitor and control systems and store system data in nonvolatile memory.

BACKGROUND

Many modern safety-related microcontroller units such as restraint system controllers generate event data records. The event data records preserve various system data occurring before and after an event, such as a vehicle accident, for use in diagnosing causes of the event and evaluating the efficacy of preventative and mitigation measures. Industry standards or regulations may require microcontrollers to store event data records according to certain protocols.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
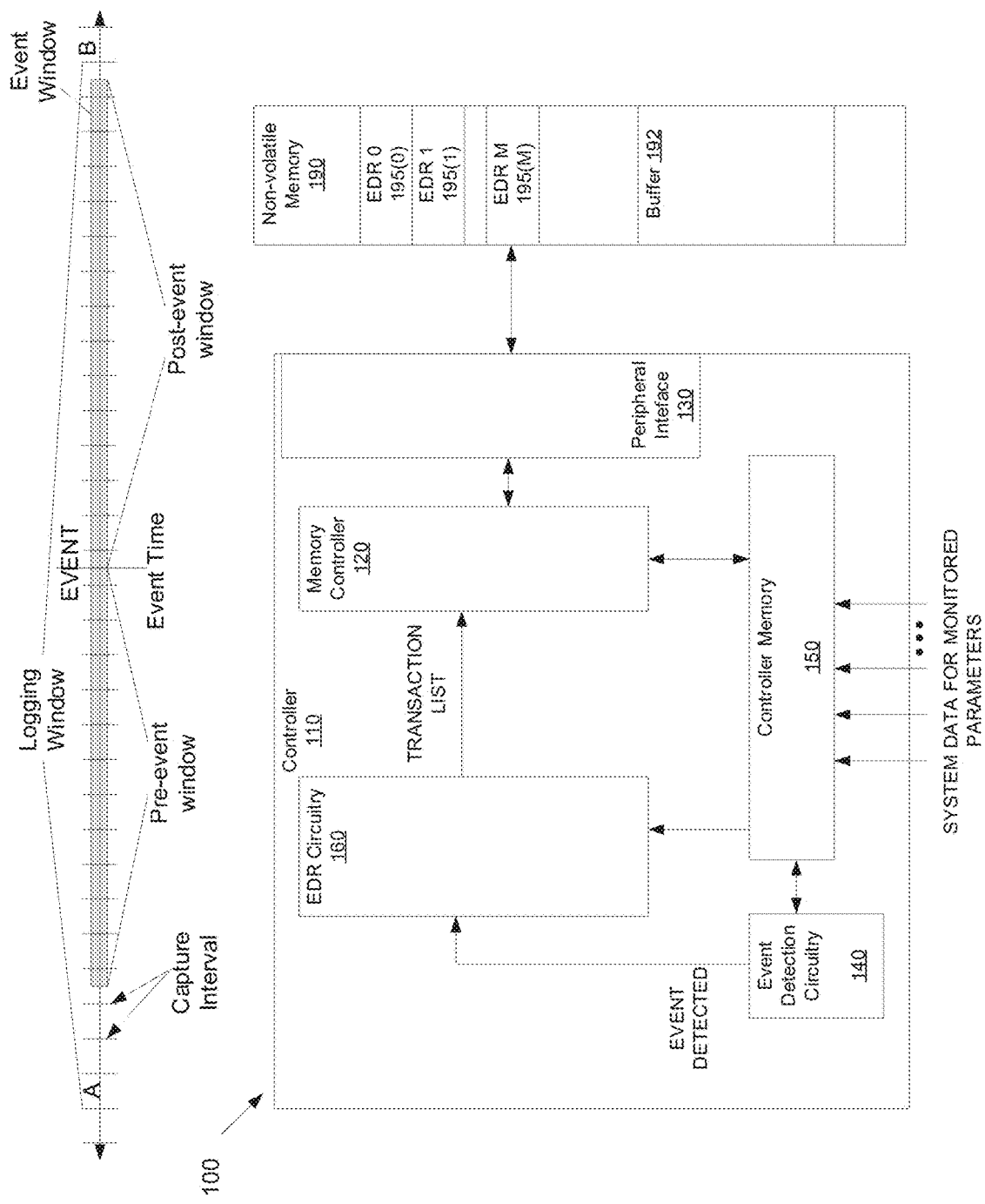
FIG. 1 is a block diagram of an exemplary architecture that includes a controller having event data record (EDR) circuitry that stores pre-event system data and post-event system data in the non-volatile memory, in accordance with various aspects described.

The timeline at the top of FIG. 1 outlines a generic event timeline that includes an event that is detected or occurs at an event time. Event data record systems are configured to store, in nonvolatile memory, system data that occurs within an event window (shown in grey) with respect to the event. The event window includes a pre-event window and a post-event window, which have predetermined time durations and may not be equal in duration.

Event data record systems may be implemented as a microcontroller unit system on chip (SoC) coupled to non-volatile memory, which may be external to the SoC. An event data record system is typically powered by the vehicle's battery until the event is detected and after the event the system is powered by a backup power source such as a capacitor bank. System data (e.g., data having values indicative of monitored parameters such as steering angle, vehicle speed, vehicle roll angle, and so on) is captured, at capture intervals, in a buffer in on-board volatile memory until the end of the event window. At the expiration of the event window, the system data occurring within the entire event window is copied from the on-board volatile memory to "event data records" (e.g., for each monitored parameter) in the non-volatile memory.

This sequential performance of the capturing of data to volatile memory and the copying of data to non-volatile memory presents several drawbacks. For example, the on-board volatile memory must have sufficient capacity to store the system data for the monitored parameters that occurs in the entire event window (which may be several seconds). Also, it may take a significant amount of time to complete the copying of all of the system data from the volatile memory to the non-volatile memory, during which time the system is operating on backup power. Should backup power fail during the copying operation, any uncopied data will be lost.

Described herein are event data record methods, systems, and circuitries that concurrently capture post-event data in non-volatile event data records (EDRs) while copying pre-event data from a buffer to the non-volatile EDRs. This significantly shortens the time needed to fully populate the EDRs and protects system data from loss during an event.

FIG. 1 illustrates an example event data record (EDR) system 100 that includes event data record (EDR) circuitry 160. The EDR system 100 may be used in a vehicle to create and store EDRs in response to certain events occurring. In this disclosure the EDR system 100 is configured to detect a collision event and react to the event by storing a record of system data that is indicative of various system parameters within some time window relative to the collision event. The system data may be received from vehicle systems such as, for example, an instrument cluster, an engine, steering system, brakes, seatbelt, or airbag. The monitored parameters may include speed, steering angle, and so on. While this disclosure may discuss the system 100 in a vehicle context, it is to be appreciated that the system may be employed in any application in which it is desirable to detect a certain event and store a record of data that is indicative of various system parameters within some time window of the event.

The system 100 includes a controller 110 coupled to non-volatile memory 190. In some examples the controller 110 is an SoC. In the illustrated example, the non-volatile memory is external to the controller (e.g., not implemented in the controller SoC). In one example the non-volatile memory 190 provides 128 kilobytes (KB) of storage. In one example, the non-volatile memory 190 is ferromagnetic random-access memory (F-RAM). F-RAM provides many benefits including fast writing speeds, long endurance (e.g., up to 100 trillion write cycles), and low power consumption.

The controller 110 includes an on-board controller memory 150 and a memory controller 120 coupled to a peripheral interface 130. The controller memory 150 receives and stores system data having values indicative of a plurality of monitored parameters. In one example, the controller memory is static random-access memory (SRAM) and may provide 8 KB of storage. In one example, the memory controller 120 is a direct memory access (DMA) controller. In one example the peripheral interface 130 is a serial peripheral interface (SPI). The memory controller 120 is configured to execute a transaction list to read and write data between the controller memory 150 and the non-volatile memory 190 by way of the peripheral interface 130. Event detection circuitry 140 monitors the system data stored in the controller memory 150 and based on the system data, detects an event. In response an EDR is created and stored.

The non-volatile memory 190 includes memory allocated to a buffer 192 and one or more EDRs 195. While the buffer 192 and the EDRs 195 are illustrated as both being implemented in a same physical non-volatile memory, in some examples, the buffer 192 and the EDRs 195 may be implemented in different physical non-volatile memories, which may or may not be external with respect to the controller 110. The buffer 192 is used to store pre-event data for the monitored parameters that occurred within the logging window (which is longer than the pre-event window). In one example the logging window is 350 milliseconds. Each EDR 195 is used to store all captured system data (pre-event and post-event) for the monitored parameters that occurred within the event window.

The buffer 192 may be configured as a ring buffer or circular buffer having a separate linear array for each monitored parameter. In one example, the buffer 192 is a set of consecutive memory address divided into subsets corresponding to ranges. Each range stores values for a given monitored parameter. Depending on a capture frequency for the different monitored parameters, the different linear arrays in the buffer may include a different amount of memory. Each linear array is configured with sufficient memory to store all captured system data for the monitored parameter occurring in the logging window. The logging window is illustrated in the time line of FIG. 1 and as an example, system data captured in capture interval A and stored in the buffer 192 will be overwritten in the buffer by the system data captured in capture interval B.

Each EDR is a linear array configured to hold all captured system data for monitored parameters that occurred within the event window. Like the linear arrays in the buffer 192, the different EDRs 195 may have different amounts of memory depending on the capture frequency of monitored parameters, but each EDR is configured with sufficient memory to store all captured system data for the monitored parameters occurring in the event window.

The EDR circuitry 160 is coupled to the event detection circuitry 140 and operates in either a pre-event mode or a post-event mode depending on whether an event has been detected. The EDR circuitry 160 operates in pre-event mode until the event time and then transitions to post-event mode and remains in post-event mode until the end of the post-event window. The EDR circuitry 160 may then transition back to pre-event mode to enable recording of EDRs for a subsequent event. When an event is detected, the event detection circuitry may set a flag that causes the EDR circuitry to function in post-event mode. In response to the event, the EDR circuitry 160 may record, in the non-volatile memory 190, various state information such as the buffer indexes that contain data for a most recent capture interval prior to the event time. In this manner, should copying of system data to the EDRs be interrupted, the copying may be completed when the EDR circuitry 160 is powered up at a subsequent time. This is possible because all of the system data within a logging window is stored in the non-volatile memory buffer 192.

When operating in pre-event mode, the EDR circuitry 160 controls the memory controller 120 to write pre-event system data from the controller memory 150 to the buffer 192. When operating in the post-event mode, the EDR circuitry 160 controls the memory controller 120 to concurrently write post-event system data directly to an EDR 195 and copy pre-event system data from the buffer 192 to the EDR 195. By concurrently, it is meant that the writing of post-event system data to the EDR is interleaved in time or performed in parallel with the copying of pre-event system data to the EDR.

The EDR circuitry 160 causes the memory controller 120 to read and write system data by generating transaction lists that each include a series of write instructions and/or read instructions and triggering the memory controller 120 to execute the transaction lists (e.g., Direct Memory Access (DMA) transaction lists). The memory controller 120 is capable of executing a transaction list without intervention by a main processor of the controller 110 (which may be implementing the EDR circuitry 160 and/or event detection circuitry 140). The use of transaction lists thus eliminates latency in the controller 110 due to the transfer of data between the controller memory 150 and the non-volatile memory 190. In one particular example, the memory controller is a DMA controller and the transaction lists include linked transaction control sets (TCS) each comprising a DMA read or write instruction. Once the execution of the transaction list is triggered, all of the TCS are executed consecutively (according to TCS order) by the memory controller 120 using a same DMA channel. To trigger the execution of the transaction list, the EDR circuitry may set a flag, generate an interrupt, or take another measure to alert the memory controller that a transaction list is to be executed.

In pre-event mode, the EDR circuitry 160 is configured to, at a periodic capture interval, for each monitored parameter, perform the following actions. First, and optionally, the EDR circuitry 160 may determine whether a capture frequency criteria for the monitored parameter is met. The capture frequency criteria defines a capture frequency for the monitored parameter on a capture interval basis. For example, the capture frequency criteria may be set to 1 if system data is to be captured for the monitored parameter in every capture interval or 2 if system data is to be captured for the monitored parameter in every other capture interval. The capture frequency criteria is not necessary if all parameters are to be captured at the same rate.

To determine if the capture frequency criteria is met, in one example, in each capture interval the EDR circuitry 160 increments a frequency counter value associated with the monitored parameter and then compares the frequency counter value to a stored target value for the monitored parameter. The capture frequency criteria is met when the frequency counter value matches the target value. When the capture frequency criteria is met, the EDR circuitry 160 resets the frequency counter value to zero.

When the capture frequency criteria is met, the EDR circuitry 160 generates a DMA write instruction that writes new pre-event system data for the monitored parameter from the controller memory 150 to the buffer 192 and adds the DMA write instruction to a DMA transaction list. Once all monitored parameters have been processed by the EDR circuitry 160 in this manner (e.g., DMA write instructions for all monitored parameters have been added to the transaction list according to capture frequency), the EDR circuitry 160 causes the memory controller 120 to execute the DMA transaction list.

Figure 2:
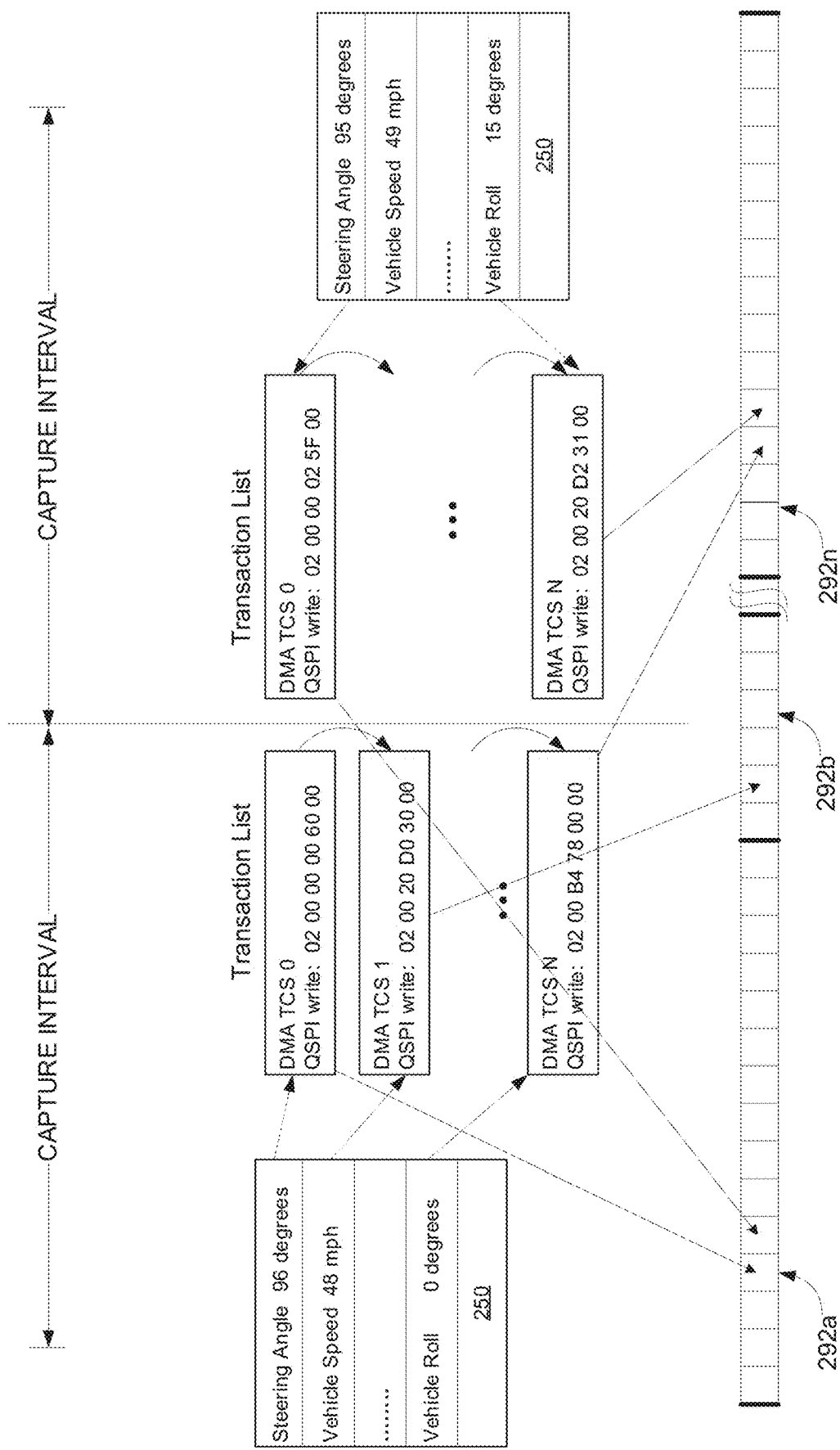
FIG. 2 is a block diagram outlining an exemplary pre-event mode of operation of the EDR circuitry, in accordance with various aspects disclosed.

FIG. 2 outlines one example of EDR circuitry operation in pre-event mode over the course of two consecutive capture intervals. For the purposes of the example, there are N monitored parameters, three of which are steering angle (parameter 0), vehicle speed (parameter 1), and vehicle roll (parameter N). A controller memory 250 is configured to store system data received from various system sensors. A buffer in non-volatile memory is configured N linear arrays.

The portion of the buffer shown in FIG. 2 includes linear array 292a for storing steering angle pre-event system data, linear array 292b for storing vehicle speed pre-event system data, and linear array 292n for storing vehicle roll pre-event system data. In the illustrated example, the steering angle and vehicle roll parameters have a capture frequency criteria of 1 while the vehicle speed parameter has a capture frequency criteria of 2.

In each capture interval, the EDR circuitry generates a write instruction for each monitored parameter that meets the capture frequency criteria and adds the write instruction to a transaction list. The write instruction includes the value of system data that is to be written to the linear array in the buffer for the monitored parameter. From MSB to LSB, each write instruction in the illustrated example includes 1 byte for the opcode, 3 bytes for the destination address, and 2 bytes for the system data value. The example write instructions are DMA TCS that include a queued serial peripheral interface (QSPI) command. Each TCS in the transaction list is linked to a subsequent TCS so that once the transaction list is triggered for execution, the instructions in the TCS are executed in order by the memory controller. Once the write instruction is generated for system data in the controller memory 250, the system data may be overwritten by subsequent data, reducing the amount of controller memory 250 that needs to be allocated to store incoming system data.

In the first capture interval, the EDR circuitry generates write instructions for steering angle system data, vehicle speed system data, and vehicle roll system data which will result in storing of the system data in the linear arrays 292a, 292b, and 292n, respectively as indicated by the arrows connected to each TCS. In the second capture interval, the EDR circuitry generates write instructions for steering angle system data and vehicle roll system data which will result in storing of the system data in the linear arrays 292a and 292n, respectively as indicated by the arrows connected to each TCS. No system data is stored for vehicle speed in the second capture interval because the capture frequency criteria is not met.

Figure 3:
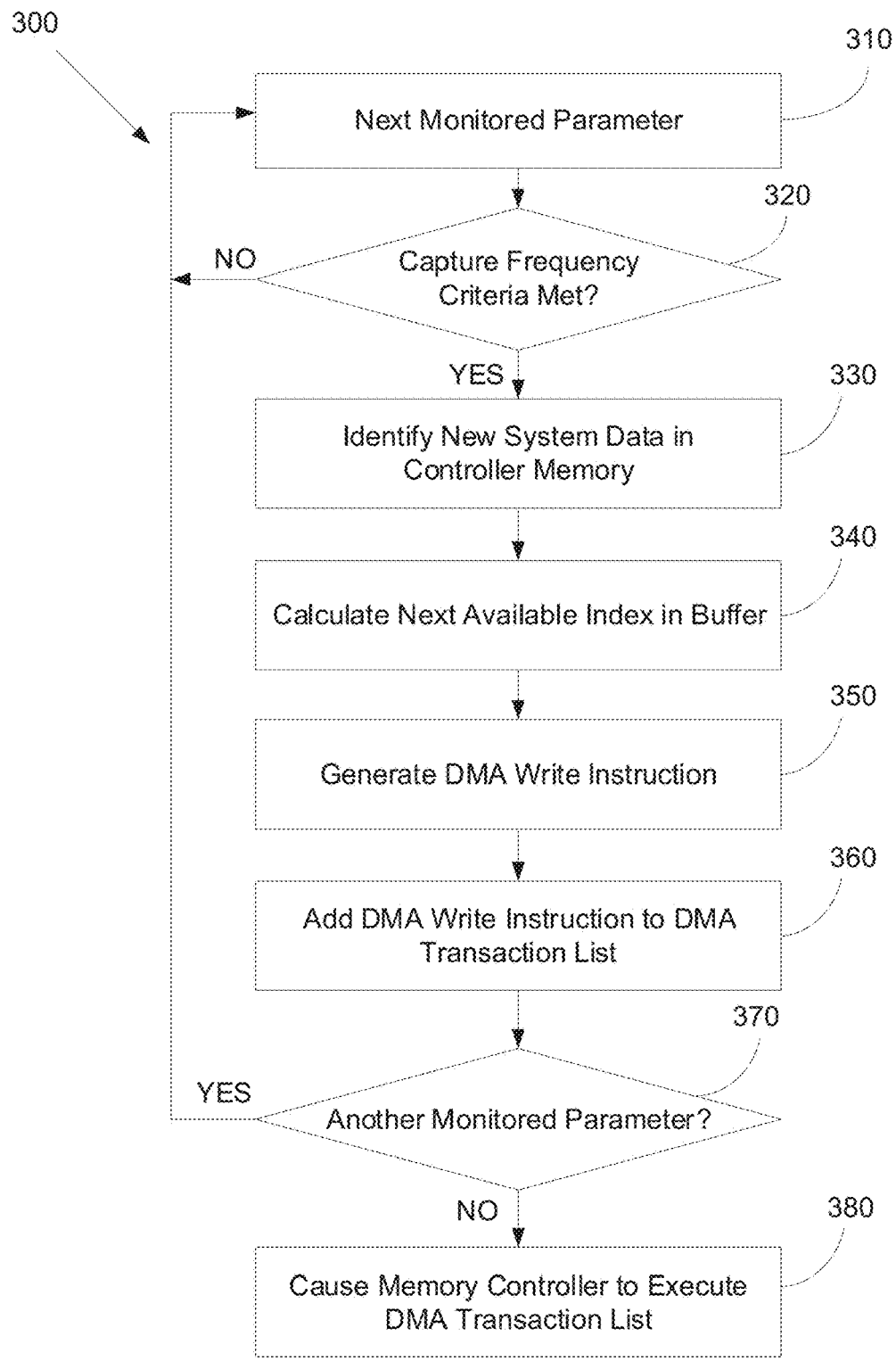
FIG. 3 is a flow diagram outlining an exemplary method of capturing pre-event system data, in accordance with various aspects described.

FIG. 3 illustrates an example method 300 that may be performed by the EDR circuitry of FIG. 1 operating in pre-event mode and when the memory controller 120 is a DMA controller. The method 300 is performed once in every capture interval. At 310 a next monitored parameter is identified for processing by the EDR circuitry. At 320 a capture frequency criteria for the monitored parameter is evaluated. If the capture frequency criteria is not met, the method returns to 310 and a next monitored parameter is identified for processing. When the capture frequency criteria is met, at 330 new system data is identified in the controller memory. At 340 a next available index in the buffer is calculated and a DMA write instruction is generated at 350. The DMA write instruction includes a write command, the calculated next available index, and the new system data. At 360 the DMA write instruction is added to a DMA transaction list. At 370 a determination is made as two whether any monitored parameters remain unprocessed. If so, the method returns to 310 and a next monitored parameter is processed. If all monitored parameters have been processed by the EDR circuitry in this capture interval, at 380, the method includes causing the DMA controller to execute the DMA transaction list. In one example, a software trigger is used to trigger initiation of the DMA transaction list.

Figure 4:
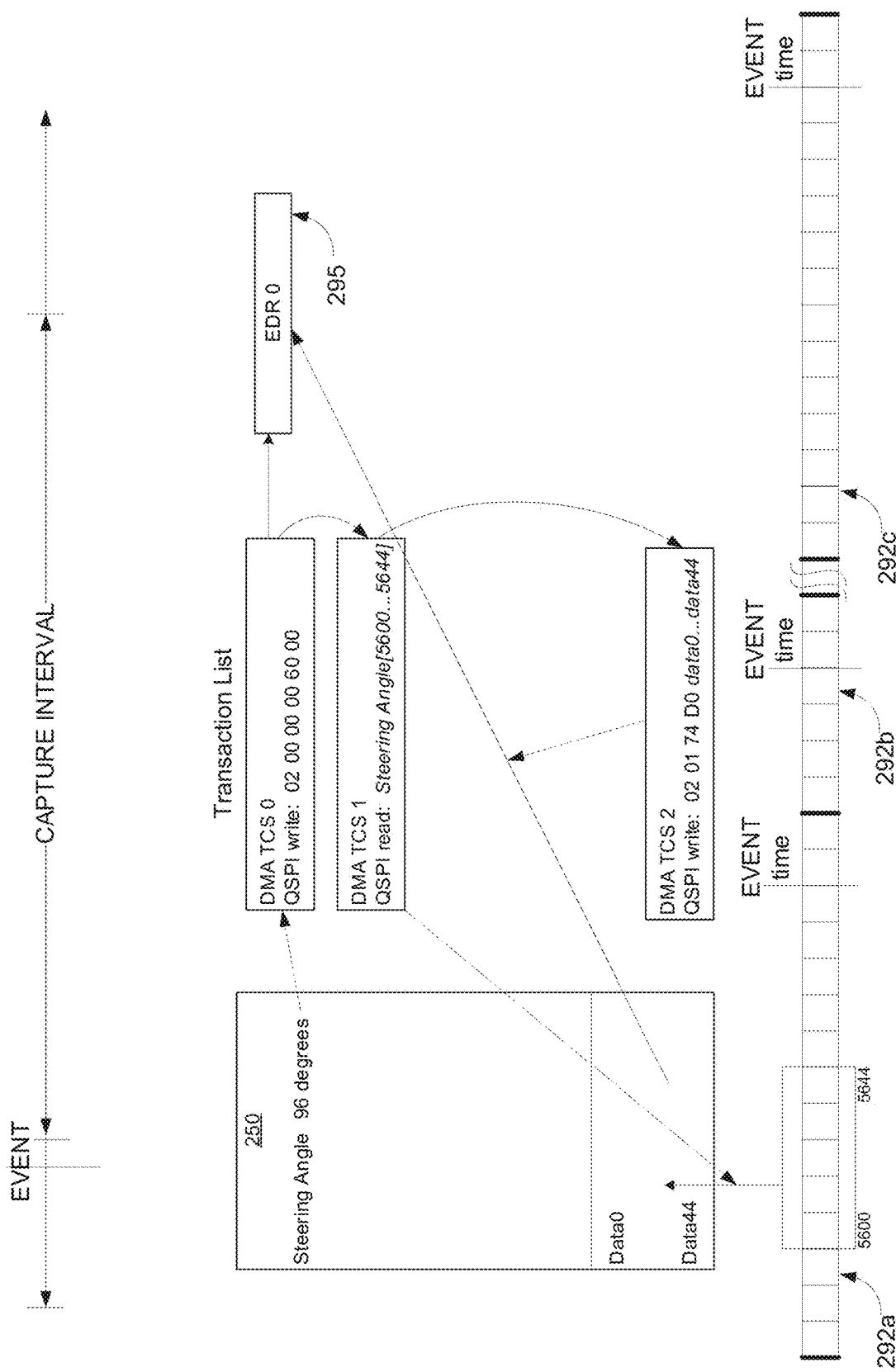
FIG. 4 is a block diagram outlining an exemplary post-event mode of operation of the EDR circuitry, in accordance with various aspects disclosed.

FIG. 4 outlines one example of EDR circuitry operation in post-event mode over the course of one post-event capture interval with reference to the controller memory 250 and the buffer linear arrays 292a, 292b, 292n of FIG. 2. For simplicity sake, processing of only the steering angle system data is illustrated in detail.

In each post-event capture interval, the EDR circuitry processes each monitored parameter as now described with respect to the steering angle system data. The EDR circuitry evaluates the capture frequency criteria and if it is met generates a write instruction. As indicated by the arrows connected to DMA TCS 0, the write instruction writes the value of system data stored in the controller memory 250 (e.g., data indicative of 96 degrees) to an EDR for the event. This is contrasted with operation in the pre-event mode in which the destination of the write instruction is the buffer 292a rather than the EDR 295.

In post-event mode, the EDR circuitry also generates a read instruction (TCS 1) and write instruction (TCS 2) that copy a chunk of pre-event system data from the buffer 292a to the EDR. As indicated by the arrows connected to DMA TCS 1, the read instruction will cause the DMA controller to read a chunk of data from the buffer 292a into controller memory 250. As indicated by the arrows connected to DMA TCS 2, the write instruction will cause the DMA controller to write the chunk of data from the controller memory 250 to the EDR 295. In the illustrated example, a chunk is 45 bytes of data. The size of the chunk may be selected based on available controller memory for storing chunk after it is read from the buffer as well as the speed with which the peripheral interface can transfer data (the copying of the chunk should complete within the capture interval).

The read instruction in the illustrated example includes a read opcode and a reference to a range of addresses corresponding to a next chunk of pre-event steering angle data in the buffer 292a. In the illustrated example, system data in buffer indexes 5600-5644 is read into the controller memory 250 by the read instruction DMA TCS 1. The write instruction DMA TCS 2 includes the write opcode and destination address within the EDR 295. The destination address within the EDR 295 may not be adjacent to the address in which the captured post-event system data written by TCS 0 is stored. The EDR circuitry is configured cause storage of the captured post-event system data and the copied pre-event system data in a coherent order in the EDR 295. The write instruction TCS 2 also includes a pointer to the location in the controller memory into which the chunk of pre-event steering angle data was read (e.g., data0 . . . data44).

Other monitored parameters will be processed in a similar manner. The EDR circuitry generates a set of transactions for each monitored parameter and adds the transactions to the transaction list. The set of transactions for each monitored parameter will either include three transactions as shown in FIG. 4 or two transactions if the capture frequency criteria for the monitored parameter is not met (e.g., the first write instruction is not generated). Once all of the monitored parameters have been processed, the EDR circuitry causes the DMA controller to execute the transaction list.

In each post-event capture interval, the EDR circuitry generates the first write instruction for post-event data (TCS 0) until the post-event window expires, at which point the EDR circuitry may begin capturing pre-event system data (for a possible subsequent event) in the buffer. The EDR circuitry generates the read instruction (TCS 1) and second write instruction (TCS 2) in each post-event capture interval until all pre-event data has been copied to the EDR 295.

Figure 5:
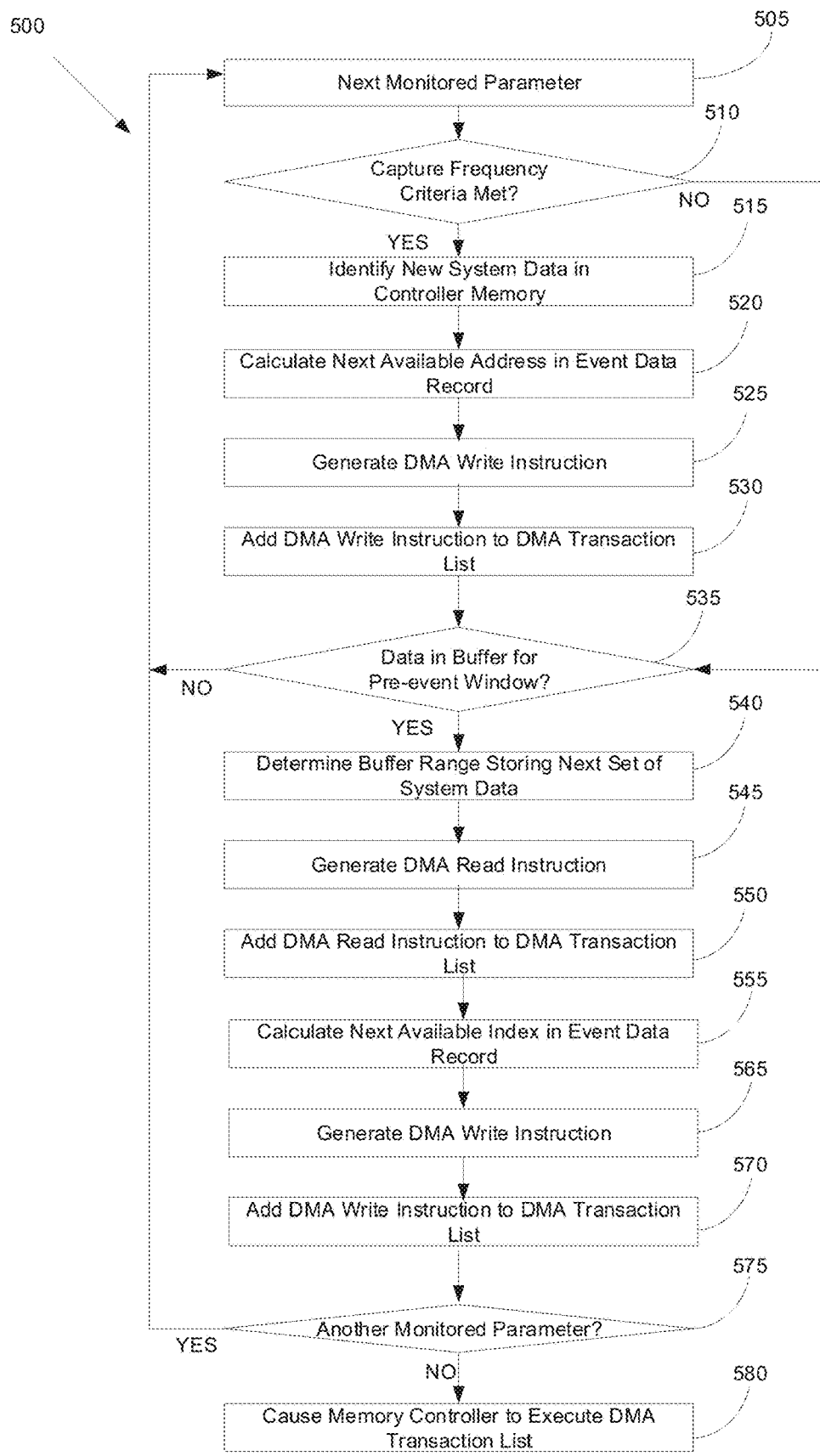
FIG. 5 is a flow diagram outlining an exemplary method of capturing post-event system data in an electronic data record while copying pre-event system data to the electronic data record, in accordance with various aspects described.

FIG. 5 illustrates an example method 500 that may be performed by the EDR circuitry of FIG. 1 operating in post-event mode and when the memory controller 120 is a DMA controller. The method 500 is performed once in every capture interval. At 505 a next monitored parameter is identified for processing by the EDR circuitry. Operations 510-530 correspond to a post-event capture function. At 510 a capture frequency criteria for the monitored parameter is evaluated. If the capture frequency criteria is not met, the method moves to 535, which will be described below. When the capture frequency criteria is met, at 520 new post-event system data is identified in the controller memory. At 520 a next available address in the event data record is calculated (e.g., based on chunk size). A DMA write instruction is generated at 525. The DMA write instruction includes a write command or opcode, the calculated next available address, and the new system data. At 530 the DMA write instruction is added to a DMA transaction list.

Operations 535 to 570 correspond to a post-event copy function for pre-event data. At 535 a determination is made as two whether pre-event system data for the monitored parameter remains in the buffer. If not, the method returns and the next monitored parameter is identified at 505. If there is pre-event system data in the buffer, at 540, the method includes determining a buffer range storing a next set of pre-event system data. At 545, a DMA read instruction is generated that includes a read command or opcode and the determined buffer range. At 550, the DMA read instruction is added to the transaction list. At 555, a next available memory address in the event data record is determined for storing the next set of pre-event system data read from the determined buffer address range by the DMA read instruction generated at 545. At 565 the method includes generating a DMA write instruction comprising a write command, the determined next available memory address in the event data record, and an indication of controller memory storing the next set of pre-event system data. At 570, the DMA write instruction is added to the DMA transaction list.

At 575 a determination is made as two whether any monitored parameters remain unprocessed. If so, the method returns to 505 and a next monitored parameter is processed. If all monitored parameters have been processed by the EDR circuitry in this post-event capture interval, at 580, the method includes causing the DMA controller to execute the DMA transaction list.

It can be seen from the foregoing description that the described systems, methods, and circuitries support concurrent capturing of post-event data in non-volatile event data records (EDRs) while copying pre-event data to the non-volatile EDRs. This significantly shortens the time needed to fully populate the EDRs and protects system data from loss during an event.

Above are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term "identify" when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, a memory controller command or write/read instruction is "generated" by EDR circuitry. As used herein generating is to be construed broadly as causing the byte values corresponding to the command to be stored in a program register or otherwise provided for access by an executing entity such as a memory controller. This may include manipulating bit values in registers or memory locations or pointing to a memory location that stores the command.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform methods and functions according to embodiments and examples described herein.

Example 1 is an event data record (EDR) system, including non-volatile memory and a controller. The non-volatile memory is configured to store a plurality of event data records for a corresponding plurality of monitored parameters, wherein each event data record includes pre-event system data and post-event system data for a given monitored parameter. The controller is coupled to the non-volatile memory, and includes controller memory, a memory controller, and EDR circuitry. The controller memory is configured to store system data indicative of the plurality of monitored parameters. The memory controller is configured to execute a transaction list, wherein the transaction list includes instructions that, when executed by the memory controller, cause the memory controller to read or write data between the controller memory and the non-volatile memory. The EDR circuitry configured to, in response to an event, generate a transaction list that includes at least one instruction that causes the memory controller to write post-event system data from the controller memory to an EDR in the non-volatile memory; generate at least one transaction that causes the memory controller to copy pre-event system data from a buffer to the EDR in the non-volatile memory; and cause the memory controller to execute the transaction list.

Example 2 includes the subject matter of example 1, including or omitting optional elements, wherein the non-volatile memory is ferromagnetic random-access memory (F-RAM).

Example 3 includes the subject matter of example 1, including or omitting optional elements, wherein the EDR circuitry is further configured to, prior to the event, generate a transaction list that includes at least one instruction that causes the memory controller to write pre-event system data from the controller memory to the buffer.

Example 4 includes the subject matter of example 3, including or omitting optional elements, wherein the EDR circuitry is further configured to, for each of the plurality of monitored parameters, evaluate a capture frequency criteria; and in response to the capture frequency criteria being met, generating the at least one instruction that causes the memory controller to write-prevent system data from the controller to the buffer; and in response to the capture frequency criteria not being met, refraining from generating the at least one instruction that causes the memory controller to write pre-event system data from the controller to the buffer.

Example 5 includes the subject matter of example 1, including or omitting optional elements, wherein the non-volatile memory includes the buffer.

Example 6 includes the subject matter of example 1, including or omitting optional elements, wherein the controller includes a serial peripheral interface (SPI) coupled to the non-volatile memory.

Example 7 includes the subject matter of example 1, including or omitting optional elements, wherein the EDR circuitry is configured to, in response to the event, control the memory controller to store values of buffer indexes that store system data occurring at a time at which the event is detected.

Example 8 is a controller, including controller memory configured to store system data received from a plurality of monitored parameters, a memory controller configured to read and write data between the controller memory and a non-volatile memory, and event data record (EDR) circuitry. The EDR circuitry is configured to operate in a pre-event mode prior an event or a post-event mode after the event, wherein in the pre-event mode, the EDR circuitry is configured to, for each monitored parameter, control the memory controller to write pre-event system data from the controller memory to a buffer in the non-volatile memory; and wherein in the post-event mode, the EDR circuitry is configured to, for each monitored parameter, control the memory controller to write post-event system data occurring during a post-event time window from the controller memory to an event data record for event in the non-volatile memory; and control the memory controller to copy pre-event system data for each monitored parameter from the buffer to the event data record for the event, wherein the EDR circuitry is configured to, in post-event mode, control the memory controller to write post-event system data from the controller memory to the event data record concurrently with controlling the memory controller to copy the pre-event system data from the buffer to the event data record.

Example 9 includes the subject matter of example 8, including or omitting optional elements, wherein the memory controller includes a direct memory access (DMA) controller and wherein the EDR circuitry is configured to, in the pre-event mode, at a periodic capture interval, for each monitored parameter, when a capture frequency criteria is met, generate a DMA write instruction that writes new pre-event system data for the monitored parameter from the controller memory to the buffer; and add the DMA write instruction to a DMA transaction list; and in response to all monitored parameters being processed by the EDR circuitry, cause the DMA controller to execute the DMA transaction list.

Example 10 includes the subject matter of example 8, including or omitting optional elements, wherein the memory controller includes a direct memory access (DMA) controller and wherein the EDR circuitry is configured to, at a periodic capture interval, for each monitored parameter, evaluate a capture frequency criteria for the monitored parameter and when the capture frequency criteria is met, identify new system data in the controller memory; calculate a next available index in the buffer; generate a DMA write instruction including a write command, the calculated next available index, and the new system data; and add the DMA write instruction to a DMA transaction list; and cause the DMA controller to execute the DMA transaction list in response to all monitored parameters being processed by the EDR circuitry.

Example 11 includes the subject matter of example 8, including or omitting optional elements, wherein the EDR circuitry is configured to, at the periodic capture interval, evaluate the capture frequency criteria for each monitored parameter by incrementing a frequency counter value for the monitored parameter; comparing the frequency counter value to a target value for the monitored parameter; determine that the capture frequency criteria is met when the frequency counter value matches the target value; and when the capture frequency criteria is met, resetting the frequency counter value to zero.

Example 12 includes the subject matter of example 8, including or omitting optional elements, wherein the EDR circuitry is configured to control the memory controller to store the system data in a circular buffer including a series of non-volatile memory addresses divided into subsets of addresses, wherein each subset of memory addresses is allocated to a different monitored parameter, further wherein a number of memory addresses in each subset is determined based on a capture frequency of an associated monitored parameter, wherein each subset of addresses stores system data occurring within a same logging window.

Example 13 includes the subject matter of example 8, including or omitting optional elements, wherein the memory controller includes a direct memory access (DMA) controller and the EDR circuitry is configured to, in the post-event mode, at a periodic capture interval, for each monitored parameter, when a capture frequency criteria is met, generate a DMA write instruction that writes new post-event system from the controller memory to an event data record for the event; add the DMA write instruction to a DMA transaction list; generate a DMA read instruction that reads a set of pre-event system data for the monitored parameter from the buffer to the controller memory; add the DMA read instruction to the DMA transaction list; generate a DMA write instruction that writes the set of pre-event system data from the controller memory to the buffer; and add the DMA write instruction to the DMA transaction list; and in response to all monitored parameters being processed by the EDR circuitry, cause the DMA controller to execute the DMA transaction list.

Example 14 includes the subject matter of example 8, including or omitting optional elements, wherein the memory controller includes a direct memory access (DMA) controller and the EDR circuitry is configured to, in the post-event mode, at a periodic capture interval, for each monitored parameter, evaluate a capture frequency criteria for the monitored parameter and when the capture frequency criteria is met, identify new post-event system data in the controller memory; determine a next available address in an event data record for the event to store the new post-event system data; generate a DMA write instruction including a write command, the determined next available address in the event data record, and the new post-event system data; and add the DMA write instruction to a DMA transaction list; for system data within a pre-event window, determine a buffer address range storing a next set of pre-event system data; generate a DMA read instruction including a read command and the determined buffer address range; add the DMA read instruction to a DMA transaction list; determine a next available memory address in the event data record to store a next set of pre-event system data read from the determined buffer address range; generate a DMA write instruction including a write command, the determined next available memory address in the event data record, and an indication of controller memory storing the next set of pre-event system data; and add the DMA write instruction to a DMA transaction list; and cause the DMA controller to execute the DMA transaction list in response to all monitored parameters being processed by the EDR circuitry.

Example 15 includes the subject matter of example 8, including or omitting optional elements, wherein the EDR circuitry is configured to, in response to the event, control the memory controller to store values of buffer indexes that store system data occurring at a time at which the event is detected.

Example 16 includes the subject matter of example 8, including or omitting optional elements, wherein, in the pre-event mode, the EDR circuitry controls the memory controller to selectively overwrite system data in the buffer so that the buffer stores system data occurring within a most recent logging window.

Example 17 is a method, including for each of a plurality of monitored parameters, controlling a memory controller to write pre-event system data from a controller memory to a buffer in a non-volatile memory. In response to detection of an event, for each of the plurality of monitored parameters, the method includes controlling the memory controller to write post-event system data occurring during a post-event time window from the controller memory to an event data record for the event in the non-volatile memory; and controlling the memory controller to copy pre-event system data for each monitored parameter from the buffer to the event data record for the event, wherein, writing of post-event system data and copying of pre-event system data are performed concurrently.

Example 18 includes the subject matter of example 17, including or omitting optional elements, wherein the memory controller includes a direct memory access (DMA) controller, further wherein the method includes, prior to detecting the event: at a periodic capture interval, for each monitored parameter, when a capture frequency criteria is met, generating a DMA write instruction that writes new pre-event system data for the monitored parameter from the controller memory to the buffer; adding the DMA write instruction to a DMA transaction list; and causing the DMA controller to execute the DMA transaction list in response to processing all of the plurality of monitored parameters.

Example 19 includes the subject matter of example 17, including or omitting optional elements, wherein the memory controller includes a direct memory access (DMA) controller, further wherein the method includes, prior to detecting the event: at a periodic capture interval, for each monitored parameter, evaluating a capture frequency criteria for the monitored parameter and when the capture frequency criteria is met, identifying new system data in the controller memory; calculating a next available index in the buffer; generating a DMA write instruction including a write command, the calculated next available index, and the new system data; and adding the DMA write instruction to a DMA transaction list; and causing the DMA controller to execute the DMA transaction list in response to processing all of the plurality of monitored parameters.

Example 20 includes the subject matter of example 17, including or omitting optional elements, wherein the memory controller includes a direct memory access (DMA) controller, further wherein the method includes, after detecting the event: at a periodic capture interval, for each monitored parameter, when a capture frequency criteria is met, generating a DMA write instruction that writes new post-event system from the controller memory to an event data record for the event; adding the DMA write instruction to a DMA transaction list; generating a DMA read instruction that reads a set of pre-event system data for the monitored parameter from the buffer to the controller memory; adding the DMA read instruction to the DMA transaction list; generating a DMA write instruction that writes the set of pre-event system data from the controller memory to the buffer; and adding the DMA write instruction to the DMA transaction list; and causing the DMA controller to execute the DMA transaction list in response to processing all of the plurality of monitored parameters.

Example 21 includes the subject matter of example 17, including or omitting optional elements, wherein the memory controller includes a direct memory access (DMA) controller, further wherein the method includes, after detecting the event: at a periodic capture interval, for each monitored parameter, evaluating a capture frequency criteria for the monitored parameter and when the capture frequency criteria is met, identifying new post-event system data in the controller memory; determining a next available address in an event data record for the event to store the new post-event system data; generating a DMA write instruction including a write command, the determined next available event data record address, and the new post-event system data; and adding the DMA write instruction to a DMA transaction list; for system data within a pre-event window, determining a buffer address range storing a next set of pre-event system data; generating a DMA read instruction including a read command and the determined buffer address range; adding the DMA read instruction to a DMA transaction list; determining a next available memory address in the event data record to store a next set of pre-event system data read from the determined buffer address range; generating a DMA write instruction including a write command, the determined next available memory address in the event data record, and an indication of controller memory storing the next set of pre-event system data; and adding the DMA write instruction to a DMA transaction list; and causing the DMA controller to execute the DMA transaction list in response to processing all of the plurality of monitored parameters.

Example 22 includes the subject matter of example 17, including or omitting optional elements, further including, in response to detecting the event, controlling the memory controller to store values of buffer indexes that store system data occurring at a time at which the event is detected.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, AB, AC, BC, and ABC.

What is claimed is:

1. An event data record (EDR) system, comprising:
   non-volatile memory configured to store a plurality of event data records for a corresponding plurality of monitored parameters;
   a controller coupled to the non-volatile memory, comprising
     controller memory configured to store system data indicative of the plurality of monitored parameters;
     a memory controller configured to write system data from the controller memory to the non-volatile memory; and
     EDR circuitry configured to, for each of the plurality of monitored parameters,
       in response to a capture frequency criteria being met, generating at least one transaction that causes the memory controller to write pre-event system data from the controller to a buffer in the non-volatile memory, wherein the capture frequency criteria is an internal variable that defines a rate at which to capture one of the plurality of monitored parameters; and
       in response to an event,
         write post-event system data from the controller memory to an EDR in the non-volatile memory;
         write buffer indexes indicating buffer locations storing pre-event system data to the EDR; and
         copy pre-event system data from the buffer to the EDR.

2. The EDR system of claim 1, wherein the plurality of monitored parameters correspond to one or more of steering angle, vehicle speed, or vehicle roll.

3. The EDR system of claim 1, wherein the EDR circuitry is configured to, after an interruption of power during the copying,
   resume copying the pre-event system data from the buffer to the EDR based on the buffer indexes stored in the EDR.

4. The EDR system of claim 1, wherein the controller comprises a serial peripheral interface (SPI) coupled to the non-volatile memory.

5. A controller, comprising:
   controller memory configured to store system data indicative of a plurality of monitored parameters;
   a direct memory access (DMA) controller configured to read and write data between the controller memory and a non-volatile memory;
   event data record (EDR) circuitry configured to operate in a pre-event mode prior an event or a post-event mode after the event,
     wherein in the pre-event mode, the EDR circuitry is configured to at a periodic capture interval, for one or more monitored parameters,
       when a capture frequency criteria is met, generate a DMA write buffer that writes new pre-event system data for the monitored parameter from the controller memory to the buffer, wherein the capture frequency criteria is an internal variable that defines a rate at which to capture one of the plurality of monitored parameters;
       add the DMA write buffer to a DMA transaction list; and
       cause the DMA controller to execute the DMA transaction list; and
     wherein in the post-event mode, the EDR circuitry is configured to, for each monitored parameter, control the memory controller to
       write buffer indexes indicating buffer locations storing pre-event system data to an event data record in the non-volatile memory, wherein the pre-event system data is a subset of the system data in the buffer that occurred in a pre-event window before the event, write post-event system data occurring during a post-event time window from the controller memory to the event data record, and concurrently with the writing of post-event system data, copy pre-event system data.

6. The controller of claim 5, wherein the EDR circuitry is configured to, when the capture frequency criteria is met,
identify new system data in the controller memory;
calculate a next available index in the buffer;
generate a DMA write buffer comprising a write command, the calculated next available index, and the new system data; and
add the DMA write buffer to a DMA transaction list; and
cause the DMA controller to execute the DMA transaction list.

7. The controller of claim 6, wherein the EDR circuitry is configured to, at the periodic capture interval, evaluate the capture frequency criteria for each monitored parameter by
incrementing a frequency counter value for the monitored parameter;
comparing the frequency counter value to a target value for the monitored parameter;
determine that the capture frequency criteria is met when the frequency counter value matches the target value; and
when the capture frequency criteria is met, resetting the frequency counter value to zero.

8. The controller of claim 5, wherein the EDR circuitry is configured to, in the post-event mode, at the periodic capture interval,
for each monitored parameter
when a capture frequency criteria is met, generate a DMA write buffer that writes new post-event system data from the controller memory to an event data record for the monitored parameter;
add the DMA write buffer to a DMA transaction list;
generate a DMA read buffer that reads a set of pre-event system data for the monitored parameter from the buffer to the controller memory;
add the DMA read buffer to the DMA transaction list;
generate a DMA write buffer that writes the set of pre-event system data from the controller memory to the buffer; and
add the DMA write buffer to the DMA transaction list; and
in response to all monitored parameters being processed by the EDR circuitry, cause the DMA controller to execute the DMA transaction list.

9. The controller of claim 5, wherein the EDR circuitry is configured to, in the post-event mode, at the periodic capture interval,
for each monitored parameter
evaluate a capture frequency criteria for the monitored parameter and when the capture frequency criteria is met,
identify new post-event system data in the controller memory;
determine a next available address in an event data record for the monitored parameter to store the new post-event system data;
generate a DMA write buffer comprising a write command, the determined next available address in the event data record, and the new post-event system data; and
add the DMA write buffer to a DMA transaction list;
for system data within a pre-event window,
determine a buffer address range storing a next set of pre-event system data;
generate a DMA read buffer comprising a read command and the determined buffer address range;
add the DMA read buffer to a DMA transaction list;
determine a next available memory address in the event data record to store the next set of pre-event system data read from the determined buffer address range;
generate a DMA write buffer comprising a write command, the determined next available memory address in the event data record, and an indication of controller memory storing the next set of pre-event system data; and
add the DMA write buffer to a DMA transaction list; and
cause the DMA controller to execute the DMA transaction.

10. The controller of claim 5, wherein the EDR circuitry is configured to, after an interruption of power during the copying,
resume copying the pre-event system data from the buffer to the EDR based on the buffer indexes stored in the EDR.

11. A method, comprising:
for each of a plurality of monitored parameters, when a capture frequency criteria is met, generating a direct memory access (DMA) write buffer that writes new pre-event system data for the monitored parameter from a controller memory to a buffer in a non-volatile memory, wherein the capture frequency criteria is an internal variable that defines a rate at which to capture one of the plurality of monitored parameters;
adding the DMA write buffer to a DMA transaction list; and
causing a DMA controller to execute the DMA transaction list; and
in response to detection of an event, for each of the plurality of monitored parameters:
storing buffer indexes indicating buffer locations that store pre-event system data in the non-volatile memory;
writing post-event system data occurring during a post-event time window from the controller memory to an event data record (EDR) in the non-volatile memory; and
copying pre-event system data for each monitored parameter from the buffer to the EDR.

12. The method of claim 11, wherein the method comprises, prior to detecting the event,
when the capture frequency criteria is met
identifying new system data in the controller memory;
calculating a next available index in the buffer;
generating a DMA write buffer comprising a write command, the calculated next available index, and the new system data; and
adding the DMA write buffer to a DMA transaction list; and
causing the DMA controller to execute the DMA transaction list.

13. The method of claim 11, wherein the method comprises, after detecting the event:
at a periodic capture interval, for each monitored parameter, when the capture frequency criteria is met, generating a DMA write buffer that writes new post-event system from the controller memory to the EDR;
adding the DMA write buffer to a DMA transaction list;
generating a DMA read buffer that reads a set of pre-event system data for the monitored parameter from the buffer to the controller memory;
adding the DMA read buffer to the DMA transaction list;
generating a DMA write buffer that writes the set of pre-event system data from the controller memory to the EDR; and
adding the DMA write buffer to the DMA transaction list; and
causing the DMA controller to execute the DMA transaction list.

14. The method of claim 11, wherein the method comprises, after detecting the event:
at a periodic capture interval, for each monitored parameter,
evaluating a capture frequency criteria for the monitored parameter and when the capture frequency criteria is met,
identifying new post-event system data in the controller memory;
determining a next available address in an event data record for the monitored parameter to store the new post-event system data;
generating a DMA write buffer comprising a write command, the determined next available event data record address, and the new post-event system data; and
adding the DMA write buffer to a DMA transaction list;
for system data within a pre-event window,
determining a buffer address range storing a next set of pre-event system data;
generating a DMA read buffer comprising a read command and the determined buffer address range;
adding the DMA read buffer to a DMA transaction list;
determining a next available memory address in the event data record to store the next set of pre-event system data read from the determined buffer address range;
generating a DMA write buffer comprising a write command, the determined next available memory address in the event data record, and an indication of controller memory storing the next set of pre-event system data; and
adding the DMA write buffer to a DMA transaction list; and
causing the DMA controller to execute the DMA transaction list.

15. The method of claim 11, further comprising,
after an interruption of power during the copying, resuming copying the pre-event system data from the buffer to the EDR based on the buffer indexes stored in the EDR.

16. The EDR system of claim 1, wherein the memory controller comprises a direct memory access (DMA) controller and the EDR circuitry is configured to, in post-event mode, at a periodic capture interval,
for each monitored parameter
when the capture frequency criteria is met, generate a DMA write buffer that writes new post-event system data from the controller memory to an event data record for the monitored parameter;
add the DMA write buffer to a DMA transaction list;
generate a DMA read buffer that reads a set of pre-event system data for the monitored parameter from the buffer to the controller memory;
add the DMA read buffer to the DMA transaction list;
generate a DMA write buffer that writes the set of pre-event system data from the controller memory to the EDR; and
add the DMA write buffer to the DMA transaction list; and
cause the DMA controller to execute the DMA transaction list.

17. The EDR system of claim 1, wherein the memory controller comprises a direct memory access (DMA) controller and the EDR circuitry is configured to, in post-event mode, at a periodic capture interval,
for each monitored parameter, when the capture frequency is met,
identify new post-event system data in the controller memory;
determine a next available address in an event data record for the monitored parameter to store the new post-event system data;
generate a DMA write buffer comprising a write command, the determined next available address in the event data record, and the new post-event system data; and
add the DMA write buffer to a DMA transaction list;
for system data within a pre-event window,
determine a buffer address range storing a next set of pre-event system data;
generate a DMA read buffer comprising a read command and the determined buffer address range;
add the DMA read buffer to a DMA transaction list;
determine a next available memory address in the event data record to store the next set of pre-event system data read from the determined buffer address range;
generate a DMA write buffer comprising a write command, the determined next available memory address in the event data record, and an indication of controller memory storing the next set of pre-event system data; and
add the DMA write buffer to a DMA transaction list; and
cause the DMA controller to execute the DMA transaction list.

18. The controller of claim 5, wherein the monitored parameters correspond to one or more of steering angle, vehicle speed, or vehicle roll.

19. The method of claim 11, wherein the plurality of monitored parameters correspond to one or more of steering angle, vehicle speed, or vehicle roll.

20. The EDR circuitry of claim 1, wherein the memory controller comprises a direct memory access (DMA) controller and wherein the EDR circuitry is configured to, at a periodic capture interval,
for each monitored parameter, when the capture frequency criteria is met,
identify new system data in the controller memory;
calculate a next available index in the buffer;
generate a DMA write buffer comprising a write command, the calculated next available index, and the new system data; and
add the DMA write buffer to a DMA transaction list; and cause the DMA controller to execute the DMA transaction list.

\* \* \* \* \*